United States Patent
Cobb (10) Patent No.: US 12,013,067 B2
(45) Date of Patent: Jun. 18, 2024

(54) MULTI-CONDUIT SYSTEM

(71) Applicants: Dan Godwin, Sydney (AU); Richard Cobb, Sydney (AU)

(72) Inventor: Richard Cobb, Burpengary (AU)

(73) Assignees: Dan Godwin, Sydney (AU); Richard Cobb, Sydney (AU)

( * ) Notice: Subject to any disclaimer, the term of this patent is extended or adjusted under 35 U.S.C. 154(b) by 85 days.

(21) Appl. No.: 17/998,538

(22) PCT Filed: May 12, 2021

(86) PCT No.: PCT/AU2021/050439
§ 371 (c)(1),
(2) Date: Nov. 11, 2022

(87) PCT Pub. No.: WO2021/226666
PCT Pub. Date: Nov. 18, 2021

(65) Prior Publication Data
US 2023/0228356 A1    Jul. 20, 2023

(30) Foreign Application Priority Data
May 12, 2020    (AU) .................................. 2020901521

(51) Int. Cl.
*F16L 39/00*      (2006.01)
*F16L 5/14*       (2006.01)
(Continued)

(52) U.S. Cl.
CPC ............. *F16L 39/00* (2013.01); *F16L 5/14* (2013.01); *F16L 43/008* (2013.01); *H02G 3/0468* (2013.01); *H02G 3/06* (2013.01)

(58) Field of Classification Search
CPC  F16L 39/00; F16L 5/14; F16L 43/008; H02G 3/0468; H02G 3/06; H02G 3/0487; H02G 3/0481
See application file for complete search history.

(56) References Cited

U.S. PATENT DOCUMENTS 259,045 A  *  6/1882  Richardson .............. F16L 39/00
285/332
1,785,403 A  *  12/1930  Babb .................... H02G 3/0487
174/95

(Continued)

FOREIGN PATENT DOCUMENTS

CN        2438245        7/2001
GB        300377 A       11/1928
(Continued)

OTHER PUBLICATIONS

International Search Report & Written Opinion dated Jul. 1, 2021 from PCT Application No. PCT/AU2021/050439.
(Continued)

*Primary Examiner* — James M Hewitt, II
(74) *Attorney, Agent, or Firm* — INNOVATION CAPITAL LAW GROUP, LLP; Vic Lin (57) ABSTRACT

A multi-conduit system has a joiner section comprising a plurality of conduits in parallel and a joining end for connection to a plurality of exposed like conduits of an adjacent section in use. The conduits of the section terminate at a proximal end of the joining end which comprises a collar widens in diameter from the conduits to form an open mouth. The collar defines an inner profile having a plurality of lobes having respective inner profiles corresponding to outer profiles of respective exposed like conduits such that, in use, when the like conduits of the adjacent section are inserted into the mouth, the lobes of the collar non-rotatably engage the like conduits to correctly align each conduit of the section with a respective like conduit of the adjacent section.

24 Claims, 9 Drawing Sheets

(51) Int. Cl.
*F16L 43/00* (2006.01)
*H02G 3/04* (2006.01)
*H02G 3/06* (2006.01)

(56) References Cited

U.S. PATENT DOCUMENTS

| | | | |
|---|---|---|---|
| 3,133,753 A | 5/1964 | Goodman et al. | |
| 4,096,887 A | 6/1978 | Streit | |
| 4,529,009 A * | 7/1985 | Horner | F16L 11/22 |
| | | | 138/113 |
| 4,709,730 A * | 12/1987 | Zwilling | G02B 6/4459 |
| | | | 138/112 |
| 5,078,432 A | 1/1992 | Seiter | |
| 5,135,265 A | 8/1992 | Bouscher et al. | |
| 5,236,227 A * | 8/1993 | Adams | F16L 39/00 |
| | | | 285/27 |
| 5,372,388 A | 12/1994 | Gargiulo | |
| 6,102,077 A * | 8/2000 | Legallais | F16L 11/22 |
| | | | 138/148 |
| 6,564,831 B1 * | 5/2003 | Sanoner | B29C 48/32 |
| | | | 138/DIG. 11 |
| 7,202,418 B2 * | 4/2007 | Glew | G02B 6/4429 |
| | | | 174/113 C |
| 2008/0092964 A1 | 4/2008 | Wang et al. | |

FOREIGN PATENT DOCUMENTS

| | | |
|---|---|---|
| GB | 2545385 A | 6/2017 |
| JP | 2000274884 A | 10/2000 |
| WO | 1997035135 A1 | 9/1997 |

OTHER PUBLICATIONS

International Report on Patentability (Chapter II) dated Dec. 20, 2021 from PCT Application No. PCT/AU2021/050439.

* cited by examiner

MULTI-CONDUIT SYSTEM

FIELD OF THE INVENTION

This invention relates generally to cable conduits and accessories for subterranean cable reticulation. More particularly, this invention relates to a multi-conduit system for separation of subterranean services.

BACKGROUND OF THE INVENTION

Subterranean PVC conduits are used for reticulation of data and electrical cabling. Usually, these conduits are run between buried concrete junction boxes, pits, buildings and structures.

Problems occur however during upgrade and maintenance wherein new cables are required to be run through existing conduits, including those having existing cabling therein.

A typical procedure entails running a resiliently flexible "snake" through the conduit to the far end whereafter the new cable is attached to the exposed distal end thereof which is pulled back through the conduit. Successfully running a snake through a conduit successfully is especially difficult for crowded conduits and/or conduits having twisted cables therein, let alone pulling the new cable back therethrough.

U.S. Pat. No. 5,372,388A (Gargiulo) 1994 Dec. 13 discloses a conduit system for underground fibre optic cable installation which has an integral multi-conduit conduit section having an outer housing having a straight coupling portion at one end and a belled coupling portion at the other end, a plurality of innerconduits disposed in a parallel manner within the outer housing and one or more spacers for parallel positioning said innerconduits in the outer housing. A three-piece innerconduit coupler disposed within the belled portion of the outer housing and engaged with the trailing ends of a plurality of innerconduits allows linear interconnection of with like conduit sections. The innerconduit coupler includes a guide for facilitating entry of the plurality of innerconduits of an adjacent conduit section into a like section; a seal that creates an air and water tight seal between the adjacent innerconduits when like sections are interconnected, without the need for cement or sealing lubricants.

U.S. Pat. No. 5,078,432A (Seiter) 1992 Jan. 7 discloses another multiple conduit conduit system for underground light guide cable installation having conduit sections which each include a coupling assembly mounted at one end of each conduit section having an outer cylindrical coupling and an inner coupling. The inner coupling includes an inner receptacle having a support plate with sockets mounted to both sides of the support plate in alignment with openings in the support plate. When the conduit sections are connected in end-to-end relationship, the protruding inner conduits of one conduit section are moved into the coupling assembly until the inner conduits are moved into the inner coupling assembly, whereupon the relatively small openings of O-rings are stretched so as to permit passage therethrough of the inner conduits to forms a seal about the inner conduits.

U.S. Pat. No. 5,135,265A (Bouscher et al) 1992 Aug. 4 discloses a flexible, multiple passage conduit assembly for use in fibre optic systems which comprises an outer elongated housing formed from circumferentially corrugated flexible plastic conduit of cylindrical configuration. A separate rigid end fitting member of generally cylindrical configuration is joined to each end of the conduit to close the ends and allow for joining the assembly to associated multiple passage conduits. A plurality of lengths of hollow flexible plastic tubing are located within the conduit housing to extend the length thereof. The lengths of tubing terminate in open ends adjacent the end fittings. The open ends of the tubing are connected to the end fitting members by connections which permit relative axial movement between the lengths of tubing and at least one of the end fitting members.

The present invention seeks to provide multi-conduit conduit system, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a multi-conduit system comprising a joiner section comprising a plurality of conduits in parallel and having a joining end for connecting to a plurality of like conduits of an adjacent section in use.

The conduits of the section terminate at a proximal end of the joining end and the joining end comprises a collar extending from the proximal end to a distal end of the section. The collar widens in diameter from the conduits to form an open mouth.

The collar defines an inner profile having a plurality of lobes having inner profiles corresponding to outer profiles of respective like conduits. As such, in use, when the like conduits of the adjacent section are inserted into the mouth, the lobes of the collar non-rotatably engage the like conduits to correctly align each conduit of the section with a respective like conduit of the adjacent section.

The collar may be sized to frictionally engage the like conduits of the adjacent section and may form an airtight connection which may allow pneumatic blowing of fibre through the conduits.

The sections may be formed to reduce or eliminate gaps or edges between aligned conduits which may snag or hinder reticulation of cable therethrough.

The present configuration has manufacture cost advantages in light of the aforedescribed existing arrangements including in comprising less componentry and may be easier to install wherein sections may be simply plugged together wherein the configuration of the collar lobes allows for the correct alignment of conduits without creating interior edges or gaps which may hinder cable reticulation.

The conduits may comprise a central conduit surrounded by a plurality of outer conduits which optimises interior cross section and structural resilience. Each other conduit may be connected at three points (i.e., by interfacing a pair of adjacent outer conduits and the inner conduit) which increases structural resilience and adjacent walls of conduits may converge which increases structural resilience and minimises the maximum diameter of the conduits.

In alternative embodiments, the conduits 102 may not be circular in cross-section but may different cross-section which maximises volumetric cross-section and minimises overall diameter of the section 101. For example, the conduits 102 may be hexagonal and wherein adjacent conduit 102 share straight walls therebetween.

The sections may include corner sections wherein the conduits go through a bend. The conduits of the corner section may be helical to eliminate conduit length differences between either end thereof. In other words, the helical conduits provide a uniform and equal length and radii through a change of direction for all of the conduits 102.

The sections may include a straight section which may be cut to length to join adjacent sections having respective joining ends. The sections may include a joining section which may be straight, have conduits extending straight from one end thereof and have a joining end extending from the other end thereof thereby allowing female-to-female or male-to-male interfacing of sections.

The system may include a pit bush section for interfacing through walls of cable pits, including in a way which prevents sharp edges.

The sections may be colour-coded or mechanically keyed so ends of conduits may be identified at each end of the system.

The sections may comprise a diameter off 100 mm allowing for retrofit in existing cable systems.

Unused conduits may be individually sealed, including with Jack Moon duct plugs for rodent prevention.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 4:
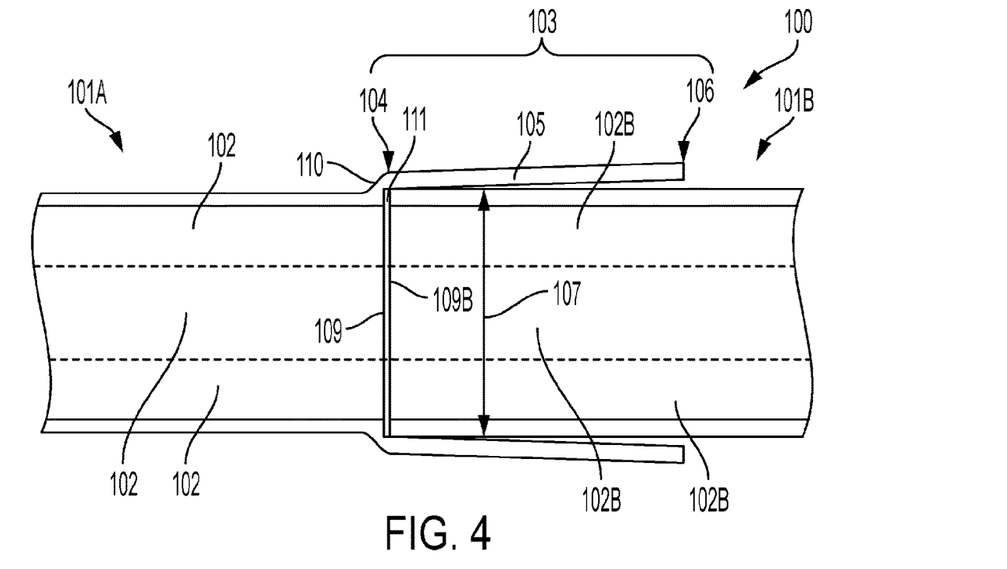
FIG. 4 shows a side elevation view of the interconnection of adjacent sections in accordance with an embodiment.

With reference to FIG. 4, a multi-conduit system 100 comprises a joiner section 101A comprising a plurality of conduits 102 in parallel and having a joining end 103 for connection to a plurality of exposed like conduits 102B of an adjacent section 101B in use.

The conduits 102 of the section 101A terminate at a proximal end 104 of the joining end 103 and the joining end 103 comprises a collar 105 extending from the proximal end 104 to a distal end 106 of the section 101A and which widens in diameter from the conduits 102 to form an open mouth 107.

Figure 5:
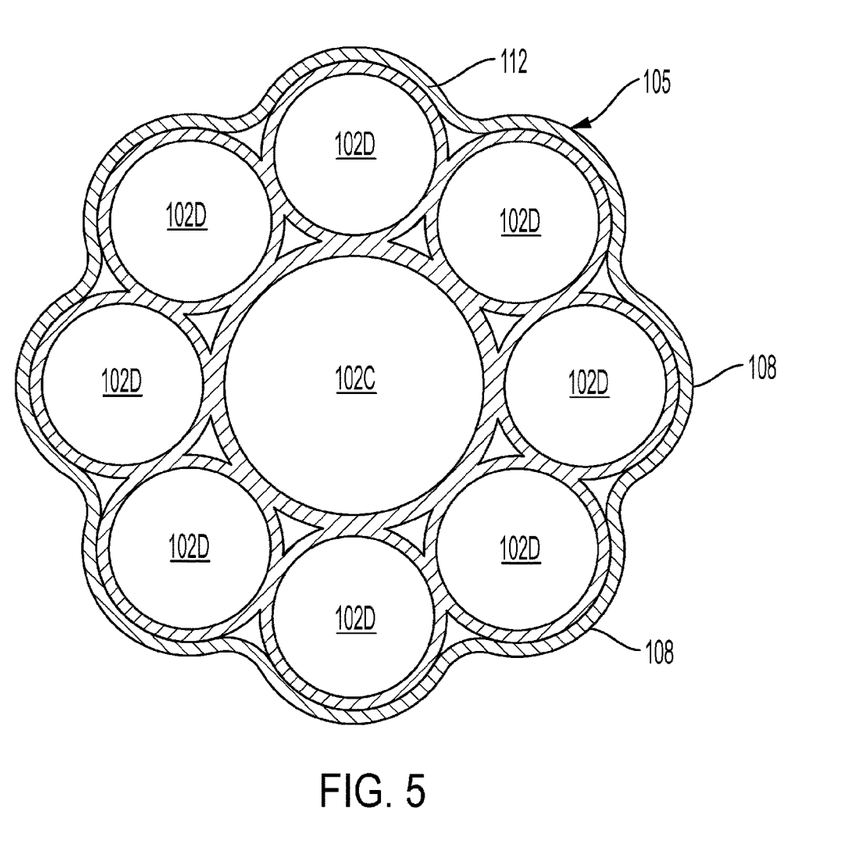
FIG. 5 shows an end cross-sectional view of the interconnection of the adjacent sections of FIG. 4.

The collar 105 defines an inner profile best seen in FIG. 5 having a plurality of lobes 108 having inner profiles corresponding to outer diameters of respective like conduits 102B. The lobes 108 may be generally semicircular in cross-section to follow around the outside of each generally circular conduit 102.

As such, in use, when the like conduits 102B of the adjacent section 101B are inserted into the mouth 107, the lobes 108 of the collar 105 non-rotatably engage the exposed like conduits 102B to correctly align each conduit 102 of the section 101A within a respective like conduit 102B of the adjacent section 101B.

The inner profile of the collar 105 may be configured so that the collar 105 frictionally engages the like conduits 102B of the adjacent section 101B. The frictional engagement may be sufficient alone to substantially prevent the sections 101 pulling apart but, in embodiments, sections 101 may be glued together with suitable adhesive, such as conventional pipe glue. In embodiments, mechanical interlock (not shown) may together to hold the sections 101 together.

The inner profile of the collar 105 may be sufficient to form a substantially airtight (or watertight) seal between sections 101, suitable for blowing of optic fibre and the like therethrough.

In embodiments, the collar 105 may decrease in diameter towards a proximal end 104 so the friction between the collar 105 and the like conduits 102 of the adjacent section 101B increases as the conduits 102B insert further into the mouth 107.

The section 101 is preferably integrally formed. The section 101 and preferably the conduits 102 thereof are preferably rigid conduits, such as made from Polyvinyl Chloride (PVC) plastic plastic.

Furthermore, as is shown in FIG. 5, the collar 105 may have a uniform wall thickness. In other words, the outer profile of the collar 105 may follow the inner profile thereof.

Again, with reference to FIG. 4, the conduits 102 may define an interfacing face 109 and the like conduits 102B from an adjacent interfacing face 109B which mate flush without a substantial gap therebetween when the like conduits 102B are engaged within the collar 105. The faces 109, 109B may be planar and orthogonal with a longitudinal axis of the respective conduits 102, 102B.

The collar 105 may comprise a length of between 80 mm and 150 mm, preferably approximately 100 mm or 120 mm.

Furthermore, the section 101 may comprise an external diameter of approximately 100 mm.

Referencing FIG. 4, the section 101A may have a smooth exterior transition 110 between an exterior surface of the conduits 102 and the collar 105.

The section 101 however may have an interior step transition 111 between the conduits 102 and the inner surface of the collar 105 thereby forming a peripheral edge 112 shown in FIG. 5. The peripheral edge 112 may comprise a thickness matching that of the conduits 102 so that inner surfaces or adjacently aligned conduits 102 match exactly without creating edges which may snag or hinder reticulation of cable therethrough.

Figure 1:
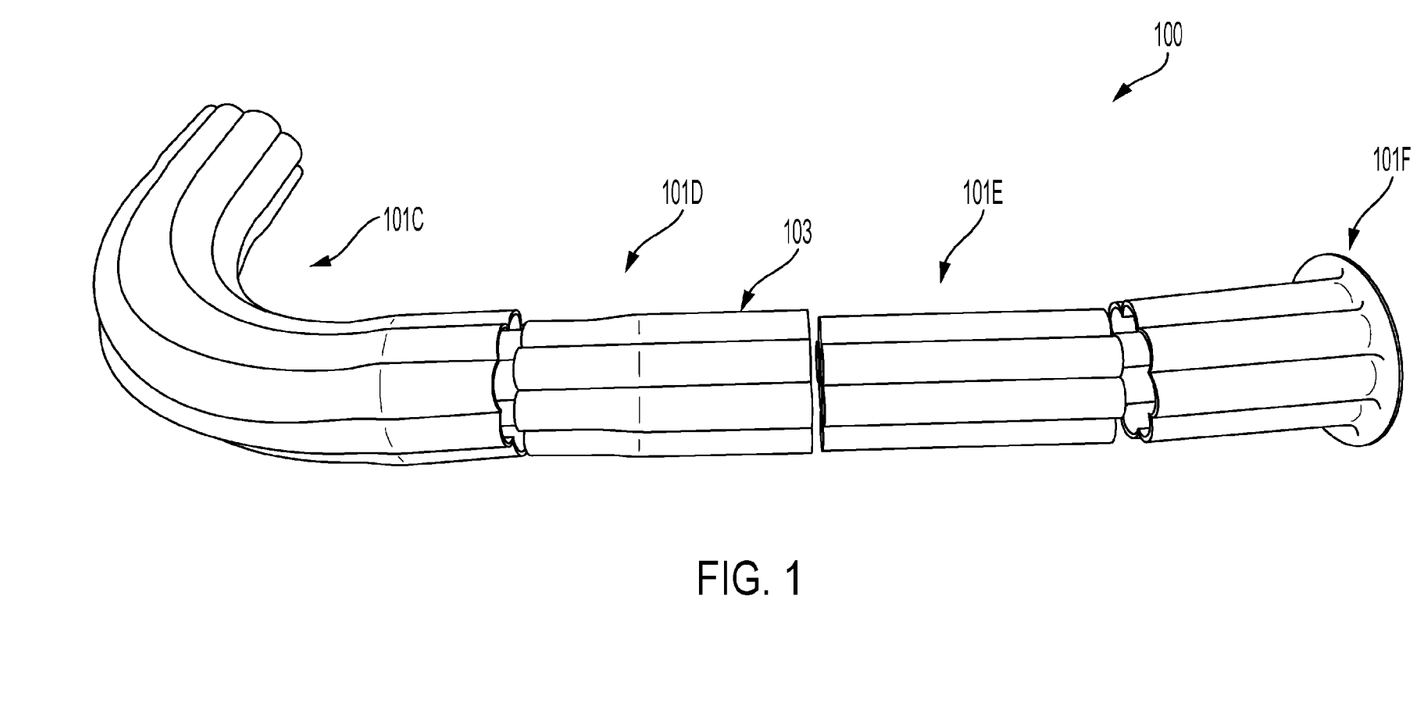
FIG. 1 shows a disassembled multi-conduit system in accordance with an embodiment.

FIG. 1 shows wherein the system 100 comprises different types of sections 100.

The sections 101 may comprise a corner section 101C which bends through an angle, such as 90°.

The sections 101 may comprise a joiner section 101D which is straight and which has the aforedescribed joining end 103 at one end thereof.

The sections 101 may further comprise a straight section 101E comprising a plurality of parallel conduits 102 and which may be of variable lengths, such as 4 m lengths and which may be cut to length in use.

The sections 101 may further comprise a pit bush 101F.

Figure 2:
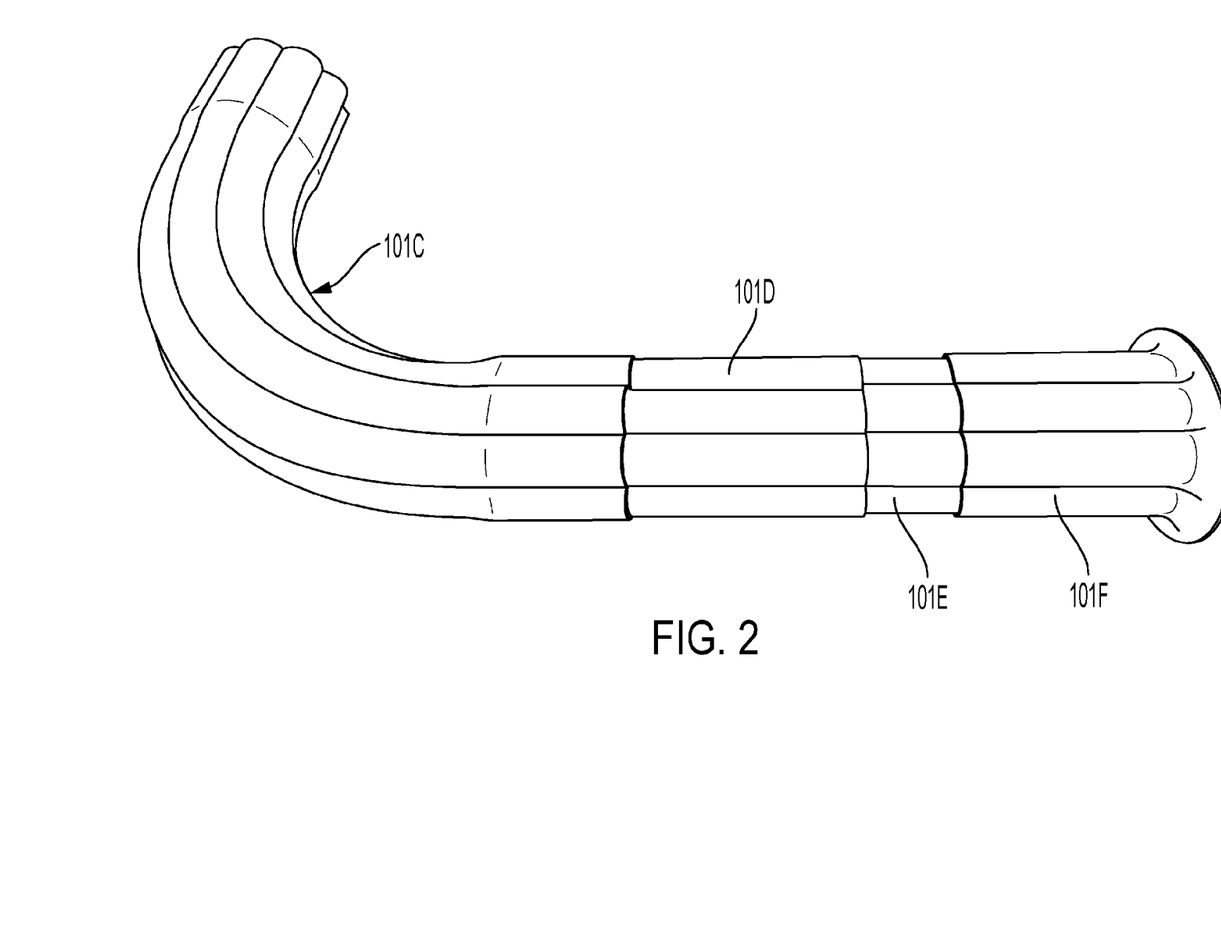
FIG. 2 shows the system of FIG. 1 assembled.

As is shown in FIG. 2, these sections 101 may be joined together in various configurations to make various conduit paths for different types of services, such as data and electrical services. In use, different types of services are run through different conduits 102.

Figure 3:
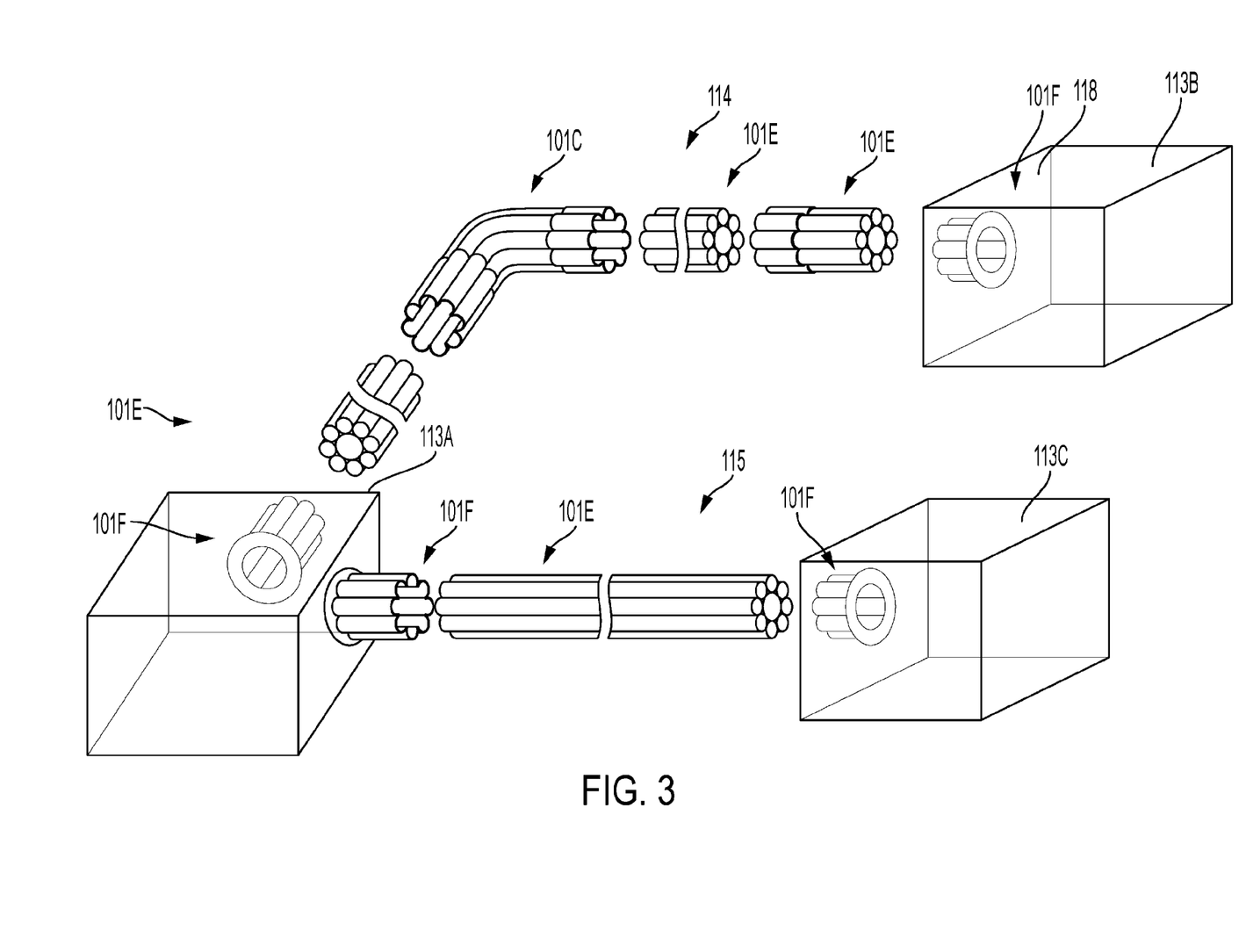
FIG. 3 illustrates utilisation of the system for forming multichannel interconnections between data and/or communication pits.

Specifically, FIG. 3 shows the system 100 used for forming multiple conduits interconnecting data and/or electrical service pits 113.

Specifically, FIG. 3 shows the sections 100 forming a right-angled interconnection 114 between a first pit 113A and second pit 113B.

The right-angled interconnection 114 comprises a straight section 101E interfacing a pit bush 101F of the first pit 113A and the corner section 101C which interfaces a further straight section 101E which, in turn, interfaces a joiner section 101E. The conduits 102 of the joiner section 101E may interface a further pit bush 101F of the second pit 113B.

In embodiments, a straight-through joiner section (not shown) may be provided which essentially just comprises the aforedescribed collar 105 (i.e., comprising the plurality of lobes 108) which can be used to interconnect exposed conduits 102 of adjacent straight sections 101E in alignment.

FIG. 3 shows the forming of a straight interconnection 115 between the first pit 113A and a third pit 113B which comprises a straight section 101E interfacing respective pit bushes 101F of the first pit 113 and the third pit 113C.

Figure 6:
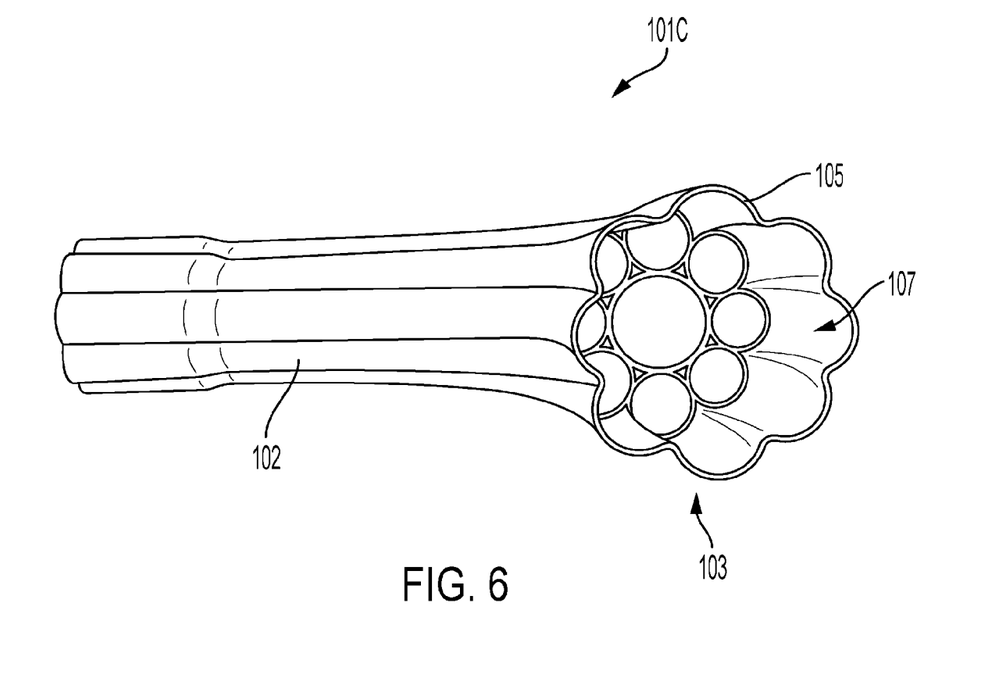
FIG. 6 shows an end perspective view of a corner section in accordance with an embodiment.
Figure 7:
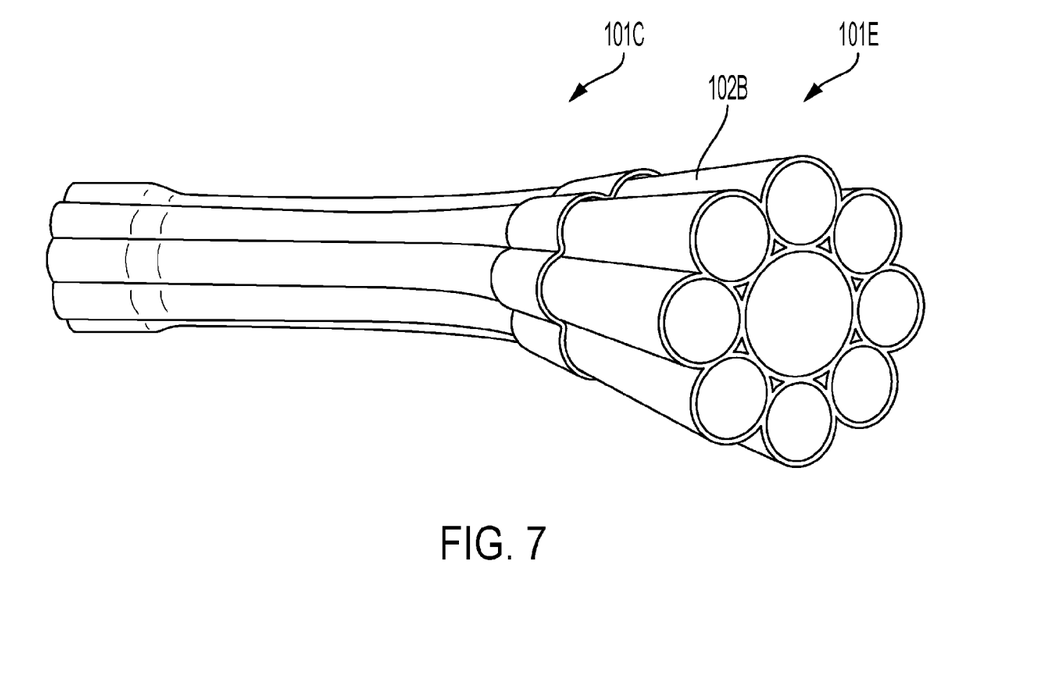
FIG. 7 shows the corner section engaging a straight section.

FIG. 6 shows the corner section 101C in further detail which goes through 90°. However, in alternative embodiments, corner sections 101C may be provided to go through other angles, including 45°. In embodiments, the conduits 102 of the corner section 101C may be slightly flexible so as to allow the corner section 101C to make arbitrary angles. FIG. 6 shows the mouth 107 formed by the collar 105 of the joining end 103 and FIG. 7 illustrates the insertion of the straight section 101C therein. FIG. 6 shows how the interface face 109 of the conduits 102 are recessed within the collar 105 to form a deep mouth 107 for receipt of the like conduits 102B of the straight section 101E therein and how the interface faces 109, 109B meet flush so as to prevent gaps between the conduits 102, one 0 to be.

Figure 13:
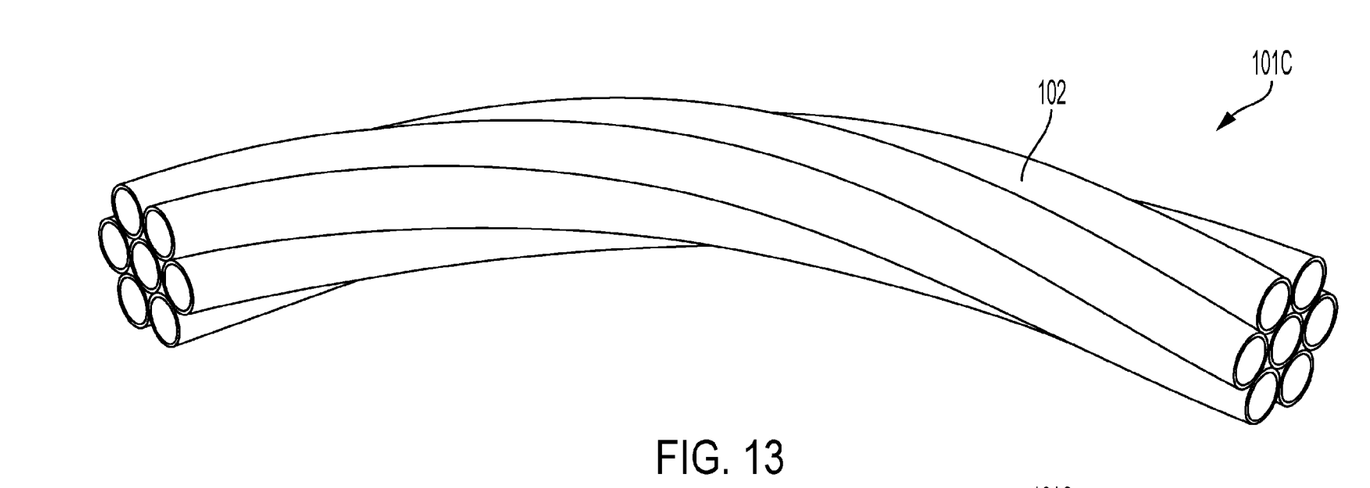
FIGS. 13 and 14 show a corner section comprising a helical arrangement of conduits.
Figure 14:
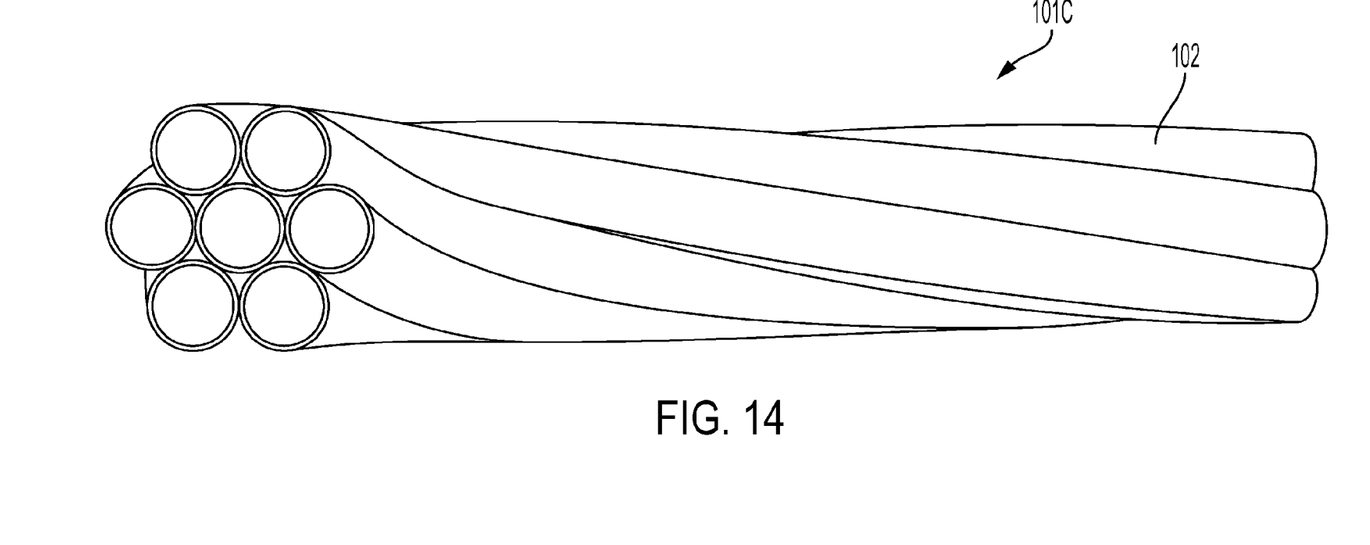

FIGS. 13 and 14 show an embodiment wherein the corner section 101C comprises helical conduits 102. The conduits 102 are helical to reduce or eliminate differences in lengths of the conduits 102 between either end of the section 101C. In a preferred embodiment, each conduit 102 may spiral through 180° between ends of the conduit 102C so that each conduit 102 is exactly of the same length. The FIGS. 13 and 14 show wherein the corner section 101C is devoid of joining ends 102.

Figure 15:
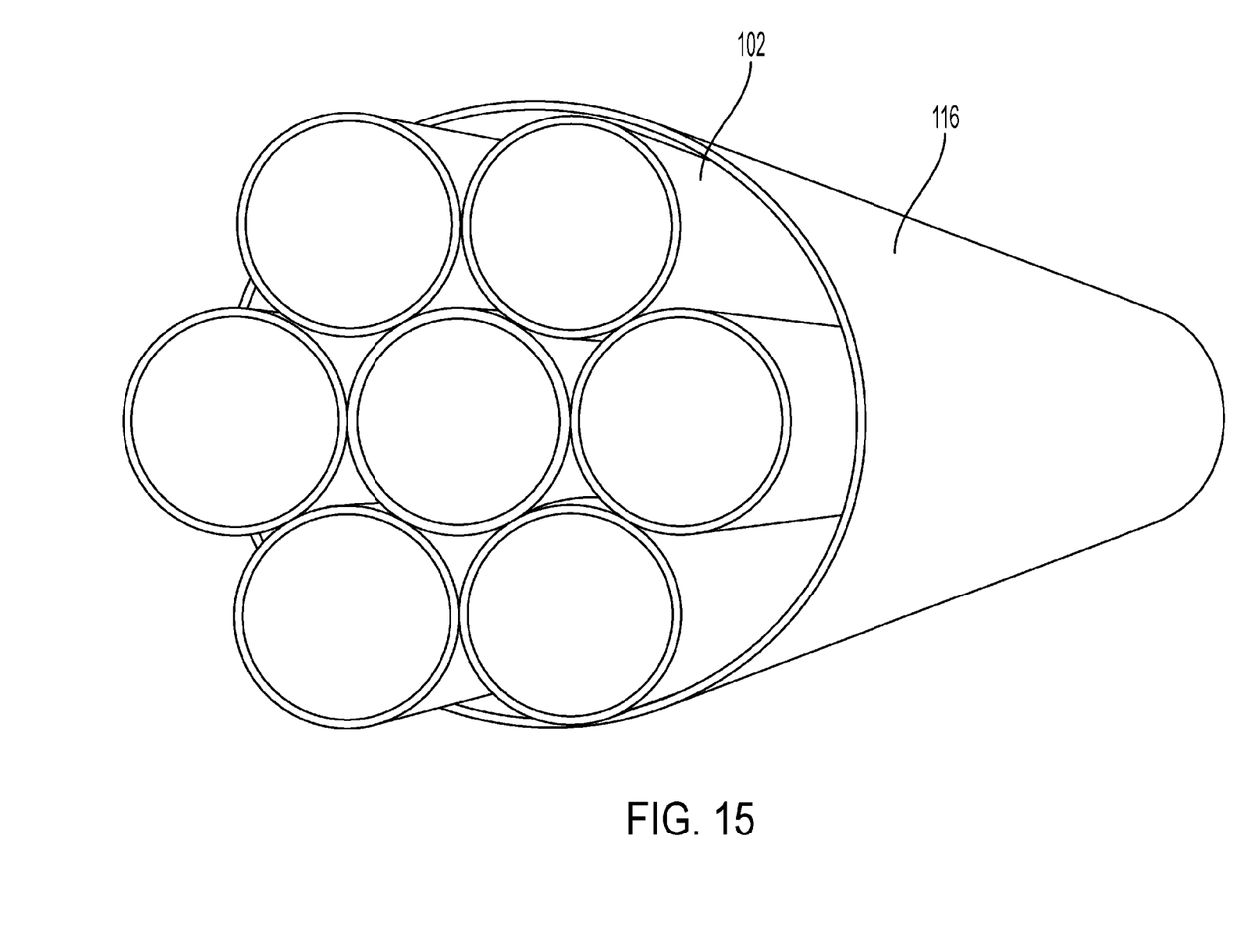
FIG. 15 shows wherein the conduits 102 a protected within an exterior jacket.

FIG. 15 shows an embodiment wherein the conduits 102 are protected within an outer protective sheath 116 and wherein the distal ends of the conduits 102 extend from the end of the sheath 116 to allow for insertion within a joining end 103.

Figure 8:
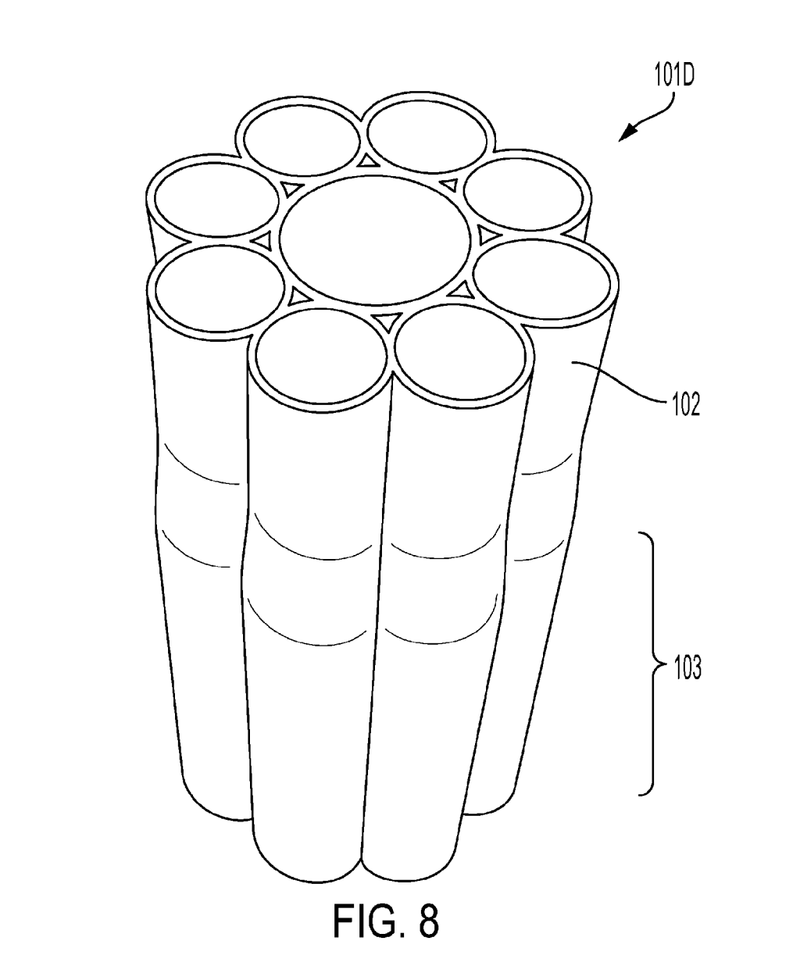
FIG. 8 shows a first end of a joiner section of the system in accordance with an embodiment.
Figure 9:
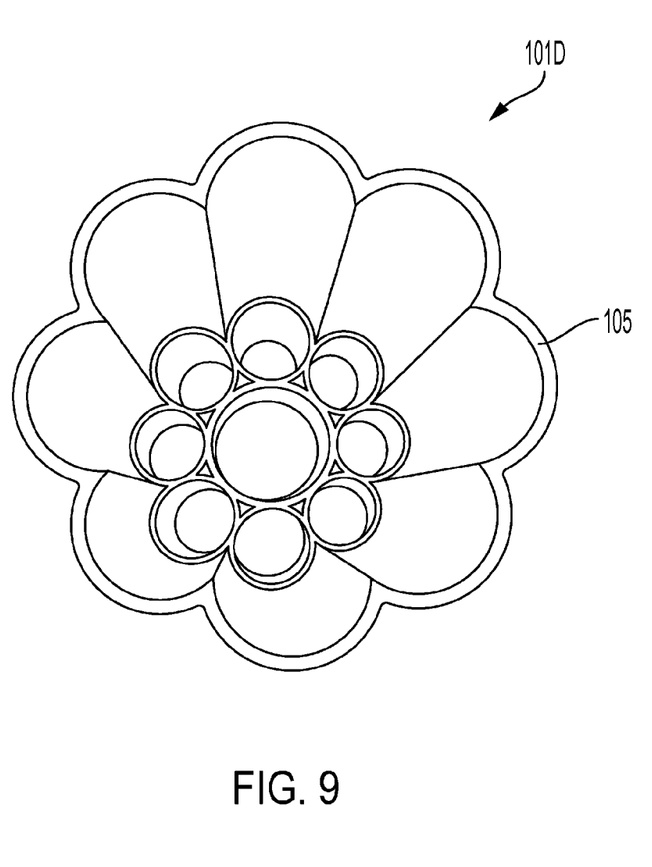
FIG. 9 shows an opposite end of the joiner section of FIG. 8 having a joining end.

FIGS. 8 and 9 show the straight joining section 101D in further detail. FIG. 8 shows the end of the joining section 101D opposite the joining end 103 wherein the conduits 102 extend parallel and straight therefrom. FIG. 9 shows the widening of the joining end 105 from the conduits 102.

Figure 10:
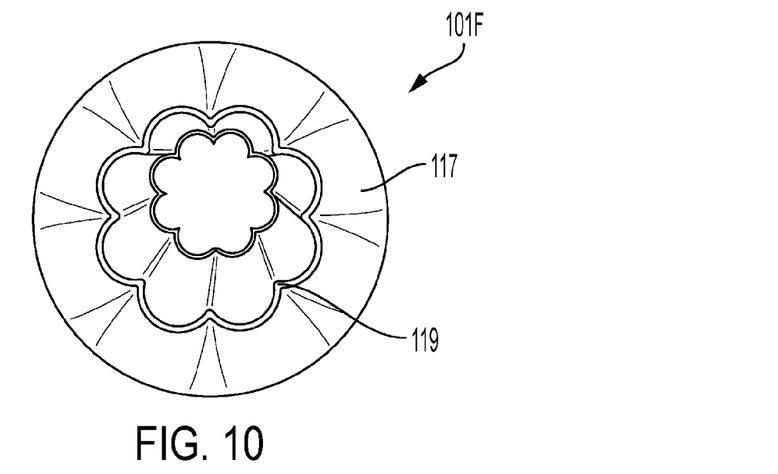
FIG. 10 shows a first end perspective view of a pit bush section in accordance with an embodiment.
Figure 11:
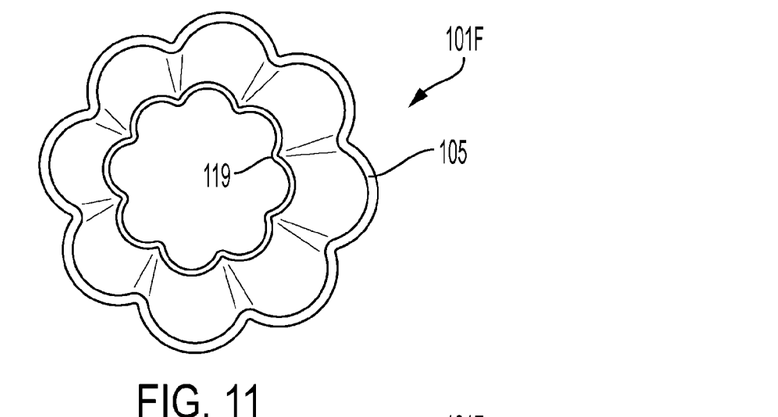
FIG. 11 shows an opposite end perspective view of the pit bush section of FIG. 10.
Figure 12:
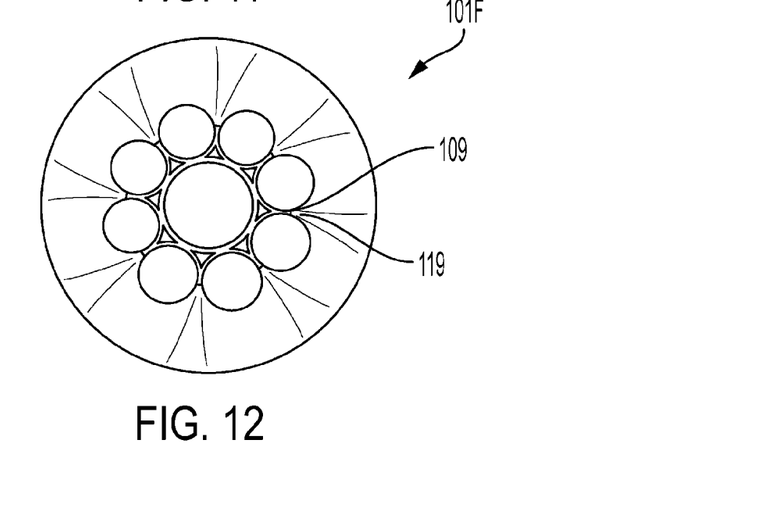
FIG. 12 illustrates the interconnection of conduits of the section with the pit bush of FIG. 10.

FIGS. 10-12 illustrate the pit bush 101F in further detail. The pit bush 101F comprises a flange 117 which, as is illustrated in FIG. 3, may interface against an exterior surface around an aperture within a vertical wall 118 of the pit 113.

In embodiments, the pit bush 101F may comprise conduits 102 extending from the flange 117. However, the embodiment shown in FIGS. 10-12 shows wherein the pit bush 101F comprises a collar 105 forming a joining end 103. The collar 105 may go right up to the flange 117 so that conduits 102 of a section 101 inserted therein may abut against the flange 117. The flange 117 may form an inner interfacing edge 119 extending in across the collar 105 which abuts against an interfacing face 109 of conduits 102 of a section 101 inserted therein as is illustrated in FIG. 12.

The inner interfacing edge 119 may partially follow an inner diameter of the conduits 102 so that no edges or gaps are created between the conduits 102 and the interfacing edge 109 which may snag cable inserted therethrough.

As shown in FIG. 5, section 101 may comprise an inner conduit 102C and a plurality of peripheral outer conduits 102. Each outer conduit 102 may be connected at three points to confer strength to the conduit 101. Specifically, each outer conduit 102 may interface a pair of adjacent outer conduits 102D and the inner conduit 102C.

In the embodiment shown in FIG. 5, the inner conduit 102C of the larger diameter than the outer conduits 102D. The inner conduit 102C may comprise an internal diameter of 50 mm whereas each outer conduit 102D may comprise an internal diameter of 32 mm. In the embodiment shown in FIG. 5, the section 101 comprises eight outer conduits 102D.

As is further shown in FIG. 5, adjacent walls of conduits 102 may converge which may further strengthen the section 101 and minimise the maximum diameter thereof. As is shown, exterior wall surfaces of like conduits 102 may converge non-tangentially such that a wall thickness between like conduits 102 is less than the sum of the wall thicknesses of each adjacent conduit 102.

The conduits 102 may be marked such as by with colour coding or the like to allow installers to follow separate channels through the system 100 for reticulation of respective services.

The sections 101 may be marked or keyed so that sections 101 are only connected together at one rotational offset. For example, the collar 105 may comprise an internal key portion which fits within a corresponding key portion of an adjacent section 101 when correctly aligned.

As such, during installation, the installer may install the sections 101 together as marked so as to maintain continuity of each conduit 101 so that respective ends of each conduit 101 may be identified at each end of the system 100.

As described above, the conduits 102 may terminate at the planar interfacing face 109 and wherein the collar 105 aligns the sections 101 together to exactly align respective conduits 102 end-to-end to avoid cable snagging edges. In embodiments, edges of each conduit 102 may mechanically interconnect, such as in a male/female relationship to enhance airtightness and watertightness between aligned conduits 102. In embodiments, one or both of aligned conduits 102 may seat a rubber O-ring which is compressed when ends of the conduits 102 come together to enhance the seal between end-to-end aligned conduits 102. The O-ring may be configured so as to not extend across the conduit 102 to avoid snagging cable run therethrough.

In embodiments, reducing and/or splitting sections 101 (not shown) may be provided. A splitting section 101 may divert one or more of the conduits 102. For example, a splitting section may comprise the aforedescribed collar 105 which engages the exposed eight outer conduits 102 but which splits one or more of the outer conduits 102 therefrom. For example, the splitting section 101 may divert one of the conduits 102 so that the remaining seven outer conduits 102 continue together in alignment. Alternatively, the splitting section 101 may divert a group of the outer conduits 102 together in alignment. For example, the splitting section 101 may split eight outer conduits 102 to two separate groups of sections 101 having four outer conduits 102.

In embodiments, a reducing section 101 may terminate one more of the conduits 102. For example, reducing section 101 may reduce a section 101 having eight outer conduits 102 to a section having seven outer conduits 102 or less.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A multi-conduit system comprising a joiner section comprising a plurality of conduits in parallel and having a joining end for connection to a plurality of exposed like conduits of an adjacent section in use, wherein the conduits of the joiner section terminate at a proximal end of the joining end and wherein the joining end comprises a collar extending from the proximal end to a distal end of the section and which widens from the conduits to form an open mouth for accepting the plurality of exposed like conduits of the adjacent section therein in use, wherein the collar defines an inner profile having a plurality of lobes having respective inner profiles corresponding to outer profiles of respective exposed like conduits such that, in use, when the exposed like conduits of the adjacent section are inserted into the mouth, the lobes of the collar non-rotatably engage the like conduits to align each conduit of the section with a respective exposed like conduit of the adjacent section and wherein the conduits comprise a circular inner conduit and a plurality of circular outer conduits surrounding the inner conduit and wherein each outer conduit interfaces a pair of adjacent outer conduits and the inner conduit at three points.

2. The system as claimed in claim 1, wherein each lobe has a generally semi-circular cross-section.

3. The system as claimed in claim 1, wherein the collar is sized to frictionally engage the conduits of the adjacent section.

4. The system as claimed in claim 3, wherein the collar decreases in cross section towards the proximal end so that frictional engagement increases as the like conduits insert towards the proximal end.

5. The system as claimed in claim 1, wherein the conduits and the collar are integrally formed.

6. The system as claimed in claim 5, wherein the collar has uniform wall thickness.

7. The system as claimed in claim 6, wherein an entire outer surface profile of the collar generally follows a corresponding entire inner surface profile of the collar.

8. The system as claimed in claim 1, wherein the conduits terminate at an interfacing face at the proximal end and wherein the like conduits terminate at an adjacent interfacing face and wherein the interfacing face and the adjacent interfacing face meet flush and without a substantial gap therebetween when the like conduits are engaged within the collar.

9. The system as claimed in claim 8, wherein the interfacing face and the adjacent interfacing face are each coplanar.

10. The system as claimed in claim 9, wherein the interfacing face is orthogonal with respect to a longitudinal axis of the conduits.

11. The system as claimed in claim 1, wherein the section has a smooth exterior transition between the conduits and the collar.

12. The system as claimed in claim 1, wherein the section has an interior step transition between the conduits and the collar forming a peripheral internal edge and wherein the peripheral internal edge has a width matching a wall thickness of the like conduits.

13. The system as claimed in claim 1, further comprising the adjacent section and wherein the adjacent section is a straight section comprising a plurality of straight conduits.

14. The system as claimed in claim 1, wherein the joiner section comprises a joining end at both ends.

15. The system as claimed in claim 1, wherein the system comprises a corner section comprising a plurality of conduits which go through a bend.

16. The system as claimed in claim 15, wherein conduits of the corner section are helical.

17. The system as claimed in claim 16, wherein each conduit of the corner section bends through 180° between ends of the corner section.

18. The system as claimed in claim 1, wherein exterior wall surfaces of like conduits converge non-tangentially such that a wall thickness between adjacent conduits is less than the sum the wall thickness of each adjacent conduit.

19. The system as claimed in claim 11, wherein the inner conduit has a larger diameter than that of the outer conduits.

20. The system as claimed in claim 19, wherein the inner conduit is surrounded by eight outer conduits.

21. The system as claimed in claim 1, further comprising a pit bush section comprising a flange having a rear face which engages around an aperture through a wall of a pit and against a wall of a pit in use, wherein pit bush section comprises a collar having a plurality of lobes and wherein the collar extends from the flange so that conduits of an adjacent section can abut against the flange.

22. The system as claimed in claim 21, wherein the flange forms an inner interfacing edge extending in across the collar which abuts against an interface face of the conduits and wherein the inner edge partially follows an inner diameter of the like conduits so that there are no edges created between the conduits and the interfacing edge.

23. The system as claimed in claim 1, wherein the collar comprises a length of between 80 mm and 150 mm.

24. The system as claimed in claim 1, wherein the joiner section and the adjacent section are at least one of coded and keyed so that the section and the adjacent section are joined together in one rotational orientation in use so that respective pairs of conduits thereof are matched.

\* \* \* \* \*